United States Patent [19]

Engles

[11] Patent Number: 4,676,019

[45] Date of Patent: Jun. 30, 1987

[54] FISHING ROD HOLDER

[76] Inventor: Richard D. Engles, 201 Valley View Rd., Sioux Falls, S. Dak. 57107

[21] Appl. No.: 819,823

[22] Filed: Jan. 17, 1986

[51] Int. Cl.⁴ .......................................... A01K 97/10
[52] U.S. Cl. ..................................... 43/21.2; 248/520
[58] Field of Search ................... 43/15, 21.2; 248/511, 248/514, 519, 520, 523, 538, 541

[56] References Cited

U.S. PATENT DOCUMENTS

| 355,716 | 9/1868 | Long et al. | 248/514 |
| 2,591,349 | 4/1952 | Goebel | 248/520 |
| 2,912,196 | 11/1959 | Johnson | 248/514 |
| 3,881,269 | 5/1975 | Timmons | 43/15 |
| 4,017,998 | 4/1977 | Dumler | 248/523 |
| 4,188,742 | 2/1980 | Oulman | 43/15 |
| 4,407,089 | 10/1983 | Miller | 43/21.2 |

FOREIGN PATENT DOCUMENTS 2849817 7/1979 Fed. Rep. of Germany .......... 43/15

Primary Examiner—Nicholas P. Godici
Assistant Examiner—Karen Skillman

[57] ABSTRACT

A device for holding a fishing rod especially useful for persons having the use of only a single hand. The base is heavy and has ribs for keeping the device in place on sandy or muddy soil. The tubular rod holder is pivotally connected to the base and is biased to a holding position but readily movable to provide a hook-setting motion.

1 Claim, 1 Drawing Figure

U.S. Patent  Jun. 30, 1987  4,676,019
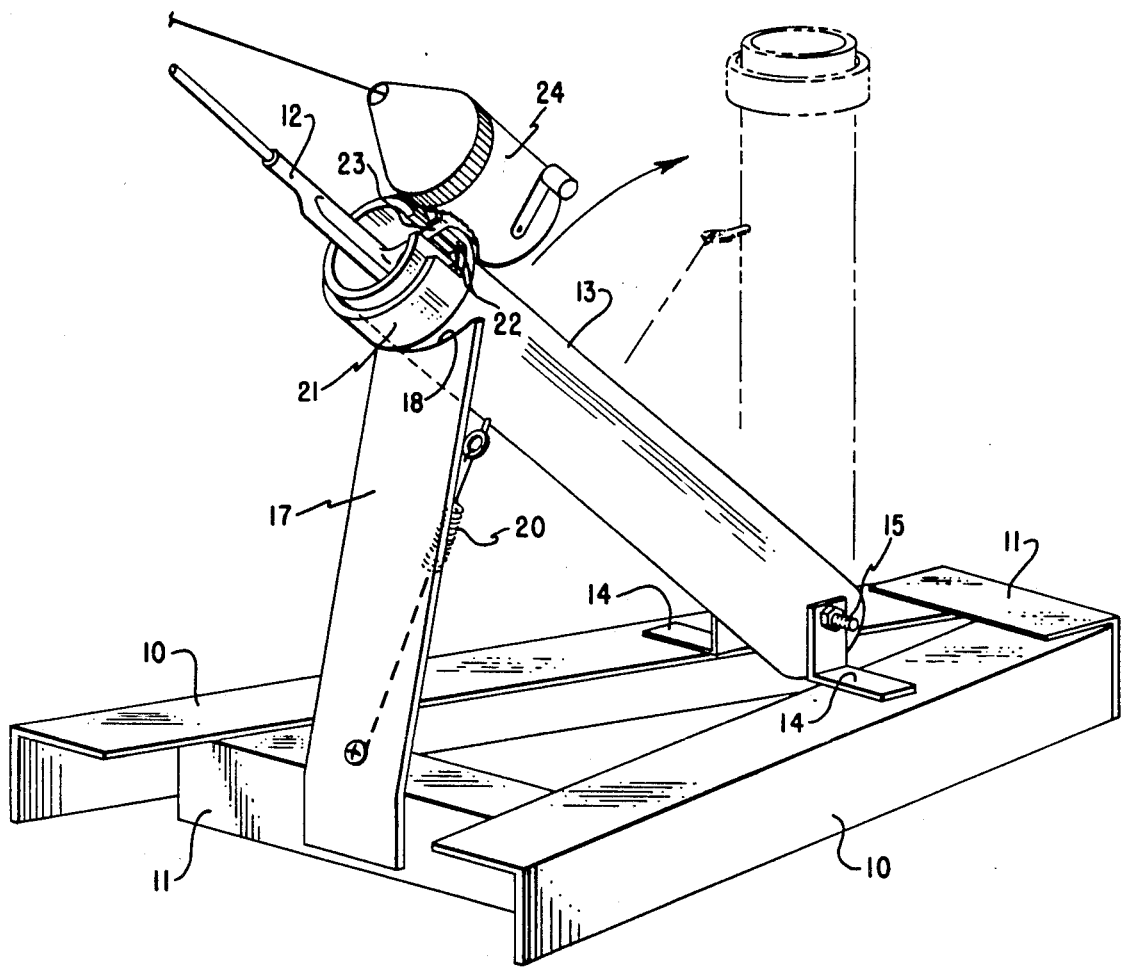

FISHING ROD HOLDER

BACKGROUND AND SUMMARY OF THE INVENTION

This invention pertains to fishing rod holders, and more particularly to a rod holder designed especially for use by a person with the use of only one arm or hand.

Angling is a very common and useful avocation or form of recreation for people having full use of arms and legs. When these people, for any reason, lose the use of some of these faculties, they may lose the ability to practice this type of recreation. That loss may be very troubling in some instances—especially in the event of stroke or the like.

By my invention, I provide a device capable of extending the ability to continue fishing even in the event of the loss of use of all limbs except a single arm. I do this by providing a device with a heavy base that does not need to be held in place, and a rod holder which can be quickly moved to set the hook when a fish strikes the bait.

FIGURE

The FIGURE is a pictorial view of the device of my invention.

DESCRIPTION

Briefly my invention comprises a fishing rod holder having a heavy base and a tubular holder pivotally mounted on the base so that the rod can be quickly jerked to set a hook.

More specifically and referring to the figures, I provide a base formed from two legs 10 joined together by cross members 11. The base may be rectangular, although I prefer a triangular or truncated triangular shape, as shown, particularly to reduce the overall size of the base. However, the base should be made of fairly heavy material such as structural steel angle iron. With this type of material disposed as shown in the figure, the base, especially if placed on a sandy or muddy bank of a body of water, is relatively fixed because the flanges of the angle iron become partially embedded in the sand or mud, and the weight of the base holds the assembly there.

A holder for the fishing rod 12 is hinged to the base. A simple form of holder may be a length of tubing or pipe 13. A pair of right angle ears 14 may be mounted on the base and an axle 15 extending through those ears 14 and the pipe 13 provides for a pivotal mounting of the holder and for a partial closure at the lower end of the pipe. The closure should not be complete so that the pipe 13 will be partly open at the bottom to allow water and dirt or sand to drain from the pipe. However, it may be desirable to have a partial closure of the lower end to prevent some types of fishing rods from slipping through the holder.

A rest 17 is adapted to prop the holder 13 at about a 45 degree angle from the horizontal as measured by the surface of the base. This rest 17 may be a strip of material fastened to a cross member 11 of the base and extending upward. I prefer to form the upper edge 18 of the strip to match the curvature of the outside of the holder 13. This formation provides a little more lateral stability for the holder than a flat edge would.

A tension spring 20 attached between the holder 13 and a fixed member such as the rest or stop strip 17 acts to bias the holder to the downward position of the device. This position is shown in the full lines in the figure. The spring 20 must be long enough to allow the holder 13 to achieve the vertical position shown in the dotted lines in the figure.

Although it is not necessary, I prefer to use a device adapted to retain the rod 12 in the holder 13. My preferred device includes a ring 21 around the upper end of the holder tube 13. This ring is able to rotate on the tube, but is not axially slidable. Both the tube 13 and the ring 21 are formed to provide slots 22 which will register with each other when the ring is in a particular rotated position. In that position, the shank 23 of the reel 24 can be slid into the slot. If the ring 21 is then turned, the shank 23 will be pinched in the slot between the ring 21 and the tube 13 and thus held in place.

In use, the user makes the customary cast with the usable arm, and then inserts the rod into the holder tube 13. The shank 23 of the reel is placed in the slot 22 and the ring 21 is turned to hold the device in place. Then, if desired, the user can adjust the tension in the line because the only usable hand is now free. At this time the holder is in the 45 degree position against the surface 18 on the rest 17. The bait is where the user desires it, and the waiting begins.

When a fish strikes the bait, the user simply grabs the rod 12 or holder 13 with a usable hand, and sets the hook. The rod is then released, and that hand is used to crank the reel to bring in the line and whatever has been hooked. It will be noted that in each operation only one hand is necessary. Thus I have provided a useful device for an angler to continue to fish even after the loss of use of one hand.

What is claimed is:

1. A fishing rod holding device comprising a base for setting on the ground, tubular means having one end pivotally mounted on said base, said tubular means being adapted to receive an end of said rod at the opposite end from the pivoted end, said pivotal mounting being such as to allow said tubular means to be pivoted from a set position below vertical to a second position near vertical, said opposite end of said tubular means being formed to provide a slot, a ring rotatably journalled on said tubular means adjacent to the end having the slot, said ring also being formed with a slot adapted to register with the slot in said tubular means whereby said ring can be turned to engage a protuberance on said rod to hold said rod in place.

* * * * *